United States Patent [19]
Chauffour et al.

[11] Patent Number: 5,977,239
[45] Date of Patent: Nov. 2, 1999

[54] AQUEOUS COMPOSITION FOR ANTIMIGRATION AND ANTIOZONE PROTECTION OF TIRES

[75] Inventors: Christian Chauffour, Clermont-Ferrand; Patrick Cohen, Durtol; Alain Cottin, Clermont-Ferrand; Georges Peyron, Riom, all of France

[73] Assignee: Michelin & CIE, Clemont-Ferrand Cedex, France

[21] Appl. No.: 09/229,715

[22] Filed: Jan. 13, 1999

Related U.S. Application Data

[63] Continuation of application No. 08/603,458, Feb. 20, 1996, Pat. No. 5,891,525.

[30] Foreign Application Priority Data

Feb. 22, 1995 [FR] France ................................ 95/02151
Oct. 30, 1995 [FR] France ................................ 95/12913

[51] Int. Cl.⁶ ...................................................... C08K 3/00
[52] U.S. Cl. ........................ 524/492; 524/493; 524/495; 524/496
[58] Field of Search ...................... 524/492, 493, 524/495, 496

[56] References Cited

U.S. PATENT DOCUMENTS

| | | |
|---|---|---|
| 4,911,218 | 3/1990 | Patitsas . |
| 4,937,282 | 6/1990 | Pfoehler et al. . |
| 5,137,070 | 8/1992 | Kansupa et al. . |
| 5,149,591 | 9/1992 | Patitsas et al. . |
| 5,258,424 | 11/1993 | Yagi et al. . |
| 5,896,525 | 4/1999 | Chaffour et al. .................. 427/387 |

OTHER PUBLICATIONS

Database WPI Week 7936, Derwent Publications Ltd., London, GB; AN 79–65424B & JP–A–54 094 561 (TOA GOSEI CHEM IND LTD) Abstract.

Chemical Abstracts, vol. 103, No. 12, Sep. 23, 1985, Columbus, Ohio, US; Abstract No. 89184d, "Elastic Coating Compositions", Abstract, p. 74 & JP–A–60 094 470 (BADISCHE PETROCHEMICAL CO., LTD).

Database WPI, Week 9221, Derwent Publications Ltd., London, GB; AN 92–172489 & JP–A–4 110 302 (TOYO INK MFG CO) Abstract.

Database WPI, Week 8907, Derwent Publications Ltd., GB; AN 89–050559 & JP–A–64 000 171 (TAIHO KOGYO) Abstract.

*Primary Examiner*—Edward J. Cain
*Attorney, Agent, or Firm*—Baker & Botts LLP

[57] ABSTRACT

Aqueous composition intended to form an antimigration and antiozone protective coating on the external surface of a tire, comprising an aqueous emulsion of at least:

(a) a polymer called constituent I, said constituent I being a homopolymer or copolymer based on at least one monomer chosen from the group of acrylic, methacrylic and vinyl esters and having a glass transition temperature below 0° C.; and (b) a constituent II chosen from the group consisting of a hydrophilic silica and a homopolymer or copolymer based on at least one monomer chosen from the group of acrylic, methacrylic and vinyl monomers, said homopolymer or copolymer having a glass transition temperature above 25° C.

1 Claim, No Drawings

AQUEOUS COMPOSITION FOR ANTIMIGRATION AND ANTIOZONE PROTECTION OF TIRES

This application is a continuation of co-pending U.S. application Ser. No. 08/603,458, filed Feb. 20, 1996, now U.S. Pat. No. 5,891,525.

BACKGROUND OF THE INVENTION

The invention relates to the surface state of tires, particularly their protection against the consequences of the various antioxidants and antiozonants that they contain migrating to the surface.

It is known that certain polymers, in particular vulcanized rubber compositions based on diene polymers containing ethylenic double bonds in their main chain, are very sensitive to the action of ozone.

When an article made with such a diene elastomer composition is subjected to the action of a stress in the presence of ozone, the deleterious effect of the ozone is manifested by the appearance of surface cracks oriented perpendicularly to the stress direction. If this stress remains, or each time it occurs, the cracks grow and may cause complete failure of the article.

In order to limit this degradation, antiozone chemical compounds as well as waxes are commonly incorporated into elastomer compositions. The antiozone chemical compounds slow down the formation and propagation of the cracks under static and dynamic stressing conditions. The waxes provide additional static protection by forming a protective surface coating.

These means of combating degradation due to ozone have proved their effectiveness. However, the most effective antiozone compounds are also characterized by a very high tendency to migrate through their polymeric substrate and end up staining and coloring the adjacent surfaces. For example, yellowish or brown stains appear at the surface of the tire walls. This phenomenon is called "coloration". Surface migration of the waxes also modifies the external appearance of the surfaces of elastomer compositions, making them dull and gray. This phenomenon is called wax "efflorescence".

These migrations are particularly damaging in the case of "white-walled" tires but they may also seriously compromise the attractive appearance of "black-walled" tires whose external surfaces lose their shiny appearance and acquire a dull grayish one.

In order to preserve the attractive appearance of the white walls of tires up to the moment when they are put into service, protective coatings are usually employed. These coatings are applied to the walls after the tires have been manufactured. They are mainly based on polyvinyl alcohol ("PVA") flexibilized by plasticizers and contain "barrier" agents, for example mica particles, in order to slow down the migration of these chemical antiozonants and these waxes to the surface. U.S. Pat. No. 5,149,591 describes one of these protective coatings. However, these coatings are visible, thick, have limited mechanical strength and must be removed before the tires are put into service. The present invention proposes to solve these problems.

The mechanical behavior of uncrosslinked polymers varies as a function of temperature, from a glassy region at low temperatures, where the behavior is glass-like, that is to say rigid and brittle, to a fluid-flow region at elevated temperatures. Between these two regions is a region called the "rubbery plateau" where the behavior is rubber-like, that is to say close to that of an elastomer, as long as the molecular weight of the polymer is high enough for there to be entanglements (see: "Viscoelastic Properties of Polymers", John D. Ferry, 3rd ed., John Wiley & Sons, 1980, especially Chapters 10, 12 and 13).

The temperature at which the mechanical behavior of the polymer changes from this glass-like, rigid and brittle behavior to this rubber-like behavior is called the "glass transition temperature" (or "$T_g$") of the polymer. This glass transition temperature is an essential characteristic of polymers.

The glass transition temperature is usually determined by differential enthalpy analysis (see "Introduction to Thermal Analysis: techniques and applications", Michael E. Brown, Pub. Chapman and Hall, New York, 1988). This technique, more commonly known by the initials DSC (Differential Scanning Calorimetry), consists in determining the variations in specific heat of a specimen whose temperature is being raised. It demonstrates the presence of transitions or reactions which are accompanied by the release of energy (exothermic transition or reaction) or absorption of energy (endothermic transition or reaction). The glass transition is an endothermic transition.

SUMMARY OF THE INVENTION

The subject of the invention is an aqueous composition intended to form an antimigration and antiozone protective coating on the external surface of a tire, this coating being such that it does not have to be removed when these tires are put into actual service.

The aqueous composition according to the invention comprises an aqueous emulsion of at least:

(a) a polymer called constituent I, said constituent I being a homopolymer or copolymer based on at least one monomer chosen from the group of acrylic, methacrylic and vinyl esters and having a glass transition temperature below 0° C.; and (b) a constituent II chosen from the group consisting of a hydrophilic silica and a homopolymer or copolymer based on at least one monomer chosen from the group of acrylic, methacrylic and vinyl monomers, said homopolymer or copolymer having a glass transition temperature above 25° C.

The constituent I chosen may especially be a styrene/butyl acrylate copolymer having a styrene content of the order of 20% by weight. The glass transition temperature of such a polymer is −21° C.

Such an aqueous composition enables a continuous, flexible and adherent coating to be formed on the surface of the tire, even in the absence of plasticizer. This coating discourages all the antiozonants present in the rubber compounds of the tire from migrating to the surface, without it being necessary to add a barrier agent such as mica, and, because of its presence, it discourages degradation due to ozone. The rubber-like behavior of the coating obtained enables it to withstand all the deformations undergone between manufacture and sale of the tires, and even thereafter.

The presence of the constituent II reduces the stickiness which a coating would have were it formed with the above component I as the sole main constituent. This stickiness is detrimental to the mechanical strength of the coating and makes it sensitive to dust and to soiling since it readily becomes dirty.

The constituent II may be a hydrophilic silica having a weight content of between 5 and 25 parts per 100 parts of dry polymer. Preferably, the silica content is between 10 and 15 parts. In addition to its effect on stickiness, the silica enhances the mechanical properties of the coating formed.

According to one embodiment, the constituent II is a homopolymer or copolymer based on at least one monomer chosen from the group of acrylic, methacrylic and vinyl monomers, said constituent II having a glass transition temperature above 25° C.

Such a constituent II may especially be a copolymer or blend of homopolymers of ethyl acrylate and methyl methacrylate having an ethyl acrylate proportion by weight of the order of 55%, or of polyvinyl acetate. In either case, the proportion by weight of the constituent II is between 35 and 55 parts by weight per 100 parts of dry polymer. Below 35 parts, the stickiness of the coating formed is often still pronounced and above 55 parts the coating obtained, being stiff, cannot easily follow the deformations undergone by the tires.

The constituent II may also be polyvinyl alcohol in the proportion of from 10 to 50 parts by weight per 100 parts of dry polymer.

According to another example, the constituent II is poly (N-vinyl-2-pyrrolidone) in the proportion of from 10 to 40 parts by weight per 100 parts of dry polymer.

In these last two cases, when the amount of constituent II exceeds the maximum values indicated, the coating formed becomes too rigid as well as too sensitive to the action of water.

The constituent II may also be a polyvinyl alcohol/poly (N-vinyl-2-pyrrolidone) copolymer.

According to another variant of the invention, the aqueous composition, in addition to the constituent I and the constituent II composed either of a copolymer or blend of homopolymers of ethyl acrylate and methyl methacrylate having a proportion by weight of ethyl acrylate of the order of 55%, or of polyvinyl acetate, may contain a constituent III consisting of a water-soluble vinyl homopolymer or copolymer chosen from the group of polyvinyl alcohols, poly(N-vinyl-2-pyrrolidone)s and vinyl alcohol/N-vinyl-2-pyrrolidone copolymers.

Adding this constituent III improves the wetting of the compositions on the rubber surface and the mechanical strength of the coating formed after drying.

Advantageously, this variant of the composition according to the invention, with at least three constituents, I, II and III, has, per 100 parts of dry polymer:

(a) from 50 to 75 parts of constituent I;

(b) from 15 to 28 parts of constituent II; and (c) from 7 to 25 parts of constituent III.

The various alternative forms of the aqueous composition according to the invention may all advantageously contain a hydrophilic silica in the proportion of from 5 to 30 parts by weight per 100 parts of dry polymer. This silica has a thixotropic effect which makes it easier to apply the aqueous composition to the rubber surface. Moreover, the amount of silica present in the composition enables the appearance of the coating obtained after drying to be changed from a shiny appearance (for an amount from 0 to 10 parts approximately) to a matt appearance (for an amount of the order of from 20 to 30 parts), passing through all possible gradations.

Advantageously, the aqueous composition according to the invention may also include surfactants in order to promote wetting on the rubber surface.

The above compositions have the advantage of producing transparent coatings which do not conceal the various markings placed on the walls of tires during their manufacture and their testing. It is thus possible for these coatings to be used for protecting white walls.

In order to give a particular attractive character to the protected rubber surface, the aqueous composition according to the invention may also contain pigments. In particular, these pigments may be carbon black in order to prevent whitening of the coating obtained after prolonged contact with water or in regions of large deformations.

In a known way, this aqueous composition may also include antifoaming agents in order to make it easier to apply with a gun.

In order to prepare an aqueous composition according to the invention, the following are put in succession into a container:

the water;

the silica, if necessary;

the carbon black or any pigment, if necessary;

the surfactant;

the antifoaming agent, if necessary;

the polyvinyl alcohol or polyvinyl pyrrolidone, depending on the case, and if necessary;

the constituent I or the constituents I and II, depending on the case.

The constituents of the aqueous composition are put in cold. Known means are used to stir until the substances of the aqueous composition are completely dispersed, then the emulsion obtained is filtered through a 150 μm nylon cloth in order to remove any small particles of poorly dispersed material.

The subject of the invention is also a method for the antimigration and antiozone protection of a tire surface, in which:

a thin layer of an aqueous composition as above is applied to said rubber surface;

said layer is allowed to dry until a protective coating is formed.

The application is performed by any known means, especially by a brush, a roller or by spraying with a gun.

In order for the coating formed to have good mechanical strength after the aqueous composition has dried, it is essential to apply the composition in one or more successive layers. Good results are obtained with dry coatings having a total thickness of between 1 and 30 μm. Preferably the coatings have a thickness of from 3 to 15 μm.

Preferably it is applied to the external surface of new tires in order to guarantee non-coloration of the tires by surface migration of chemical antiozonants, at least throughout all the transporting, storage and testing operations until they are put into service.

In addition, since the coating formed has a high mechanical strength, this coating can withstand all the above operations and remain in place after the tires have been put into service and can, by its presence, thus ensure that an attractive high-quality appearance and effective ozone protection are maintained for several thousands of kilometers and/or for several months.

Even if the coating may be sensitive to the abrasion and knocks which the tire walls may suffer in service, it has the other advantage of being removed by wearing away in the form of a fine powder without disbandment, so as to be virtually undetectable by eye.

Of course, the protective coating cannot be effective on all the parts of the tire in permanent contact with the ground, such as the tread, since in this case it wears away very rapidly. However, it is highly advantageous to deposit it over the entire surface since it coats and protects the tread before it is used and, thereafter, continues to act on all the other parts which are not in contact with the ground, such as the walls and the bottoms of the grooves of the tread patterns.

DESCRIPTION OF PREFERRED EMBODIMENTS

The invention is illustrated by means of the examples below, which should not be construed as limiting its scope.

In the examples, the properties of the compositions are evaluated as follows:

"coloration/efflorescence": test of the ability of the coating to discourage surface migration of all the antiozonants;

"handling": test of the mechanical strength of the coating when handling a tire and when fitting it onto a rim (this test imposes extensional deformations on the surface of the walls greater than 40%);

"dynamic behavior": test of the mechanical strength of the coating under dynamic stressing, 12000 kilometers on a rolling road with an imposed deflection of 35% at 60 kilometers per hour; this test imposes a dynamic extensional deformation on the surface of the walls of the order of 15%;

"rubbing": test of the mechanical strength of the coating during operations of tires rubbing against one another;

"sidewalk chafing": rubbing of the coated wall of a tire against a sidewalk over a few meters; test to see how the coating is removed under mechanical rubbing, whether by wearing away as a powder, or disbandment;

"water": test of the resistance of the coating during prolonged immersion in water, this being a simulation of long-term storage of a vehicle in a parking lot in a puddle of water;

"heat": 50° C. oven test of the resistance of the coating over at least 6 months;

"mechanical behavior after aging": weather exposure of coated tires followed by a test of the mechanical strength of the coating;

"aging/appearance": visual observation of the aesthetic appearance of the coating after deposition and during aging;

"washing": test of the resistance of the coating to washing by rubbing it with an aqueous solution to which soap has been added;

"deposition": assessment of the ease of application of the composition to a rubber surface.

Table 1 gives the formulations of the coatings tested and Table 2 gives the results obtained. The formulations are given on the basis of 100 parts of dry polymer.

TABLE 1

| Composition | A | B | C | D | E | F | G | H | I | J | K | L |
|---|---|---|---|---|---|---|---|---|---|---|---|---|
| PVA[1] | 100 | | | | 40 | | | | | | 16 | |
| PVP[2] | | | | | | 30 | | | | 16 | | 15 |
| StBuAc[3] | | 100 | 100 | 62 | 60 | 70 | 65 | 62 | 60 | 63 | 63 | 62 |
| EA/MM[4] | | | | | | | 35 | 38 | 40 | 21 | 21 | |
| PVAc[5] | | | | 38 | | | | | | | | 23 |
| silica[6] | 16 | | 13 | | | | | 21 | 12 | 22 | 22 | 22 |
| glycerine | 16 | | | | | | | | | | | |
| surfactant[7] | 30 | 9 | 9.0 | 9 | 13 | 10 | 13 | 17 | 12 | 9 | 9 | 9 |
| antifoaming agent[8] | | 12 | 12 | 12 | 26 | 20 | 12 | 17 | | 12 | 12 | 12 |
| N772 black | | | | | | | | | | 8 | 8 | 8 |
| total water | 1800 | 250 | 370 | 630 | 1200 | 1000 | 310 | 530 | 690 | 630 | 630 | 620 |

[1]polyvinyl alcohol: Rhodoviol 25/140 (Rhône-Poulenc) ($T_g$: +49° C.***);
[2]polyvinyl pyrrolidone: Luviskol K90 (BASF) ($T_g$: approx. +175° C.*);
[3]aqueous emulsion having 50% of a styrene/butyl acrylate copolymer: Rhodopas GS 125 (Rhône-Poulenc) ($T_g$: −21° C.**);
[4]aqueous emulsion having 40% of an ethyl acrylate/methyl methacrylate copolyer ($T_g$: +34° C.***);
[5]aqueous emulsion having 54% of polyvinyl acetate ($T_g$: 28 to 31° C.*);
[6]hydrophilic amorphous silica: Aerosil 200 (Degussa);
[7]nonionic surfactant: octyl phenyl polyethylene oxide (Cinnopal OP9 from Henkel);
[8]antifoaming agent: BYK 070 (BYK);
*Reference: Encyclopedia of Chemical Technology, 3rd edition, Vol. 23;
**Reference: Rhône-Poulenc measurements;
***Reference: internal measurements.

TABLE 2

| Composition | A | B | C | D | E | F | G | H | I | J | K | L |
|---|---|---|---|---|---|---|---|---|---|---|---|---|
| coloration efflorescence | +++ | ++ | ++ | ++ | +++ | +++ | +++ | +++ | +++ | +++ | +++ | +++ |
| handling | --- | + | ++ | ++ | ++ | ++ | ++ | +++ | +++ | +++ | +++ | +++ |
| dynamic behavior | --- | +++ | +++ | +++ | ++ | ++ | +++ | +++ | +++ | +++ | +++ | +++ |
| rubbing | + | − | ++ | ++ | ++ | ++ | ++ | +++ | +++ | +++ | +++ | +++ |
| sidewalk chafing | --- | + | ++ | ++ | ++ | ++ | ++ | +++ | +++ | +++ | +++ | +++ |
| water | --- | +++ | +++ | + | + | + | +++ | +++ | +++ | +++ | +++ | +++ |
| heat | --- | + | ++ | +++ | ++ | +++ | +++ | +++ | +++ | +++ | +++ | +++ |
| aging/mechanical | --- | ++ | ++ | ++ | + | + | +++ | +++ | +++ | +++ | +++ | +++ |

TABLE 2-continued

| Composition | A | B | C | D | E | F | G | H | I | J | K | L |
|---|---|---|---|---|---|---|---|---|---|---|---|---|
| behavior aging/appearance | – | – – | ++ | + | ++ | ++ | ++ | +++ | +++ | +++ | +++ | +++ |
| washing | – – – | +++ | +++ | +++ | + | + | +++ | +++ | +++ | ++ | ++ | ++ |
| deposition | +++ | + | ++ | + | ++ | ++ | ++ | ++ | ++ | +++ | +++ | +++ |

The assessment scale used in the tests is as follows:
excellent +++
very good ++
satisfactory +
inadequate –
very inadequate – –
unacceptable – – –

All the coatings formed with the compositional examples presented are very good to excellent in the "coloration/efflorescence" test.

Example A relates to an aqueous composition based on polyvinyl alcohol (PVA) with plasticizer added. This polymer has a high glass transition temperature (+49° C.) and does not impart rubber-like behavior to the coating at the temperatures at which tires are usually handled and stored. The coating obtained is excellent in terms of migration resistance and very good in respect of its ease of application; on the other hand, it is unacceptable in all the tests where large deformations are imposed on it, statically and dynamically, because it is too rigid, despite the presence of the plasticizer. This rigidity leads to disbandment from the rubber surface to which it is applied.

Example B provides the simplest solution based on a styrene/butyl acrylate copolymer. This polymer has a glass transition temperature of –21° C. and consequently the coating obtained has a rubber-like behavior and is greatly superior to the previous one in all the mechanical strength tests under high static and dynamic deformations. However, it is only satisfactory in the handling test, inadequate in the rubbing test and very inadequate in terms of appearance in the aging test because of an undesirable stickiness which makes it sensitive to rubbing and to becoming dirty.

Composition C is a first solution which corrects the stickiness, by the addition of silica. The coating obtained is very good to excellent in all the tests.

Another solution is given by coating D, by means of polyvinyl acetate. Compared to coating C, D is superior in the handling and heat resistance tests but is only acceptable in terms of water resistance because of whitening.

Examples E and F are based on the same styrene/butyl acrylate copolymer to which polyvinyl alcohol (E) or polyvinyl pyrrolidone (F) has been added. The behavior of these two coatings is very similar, being very good to excellent in all the tests, apart from the water-resistance, washing and aging/mechanical-behavior tests where they are acceptable. This is due to the solubility of these two polymers in water.

The choice of an ethyl acrylate/methyl methacrylate copolymer, as the second constituent in the aqueous composition, corresponds to Example G. The coating obtained is superior to the previous two in the water-resistance and washing tests. The mechanical strength after aging is also improved.

The mechanical properties and the appearance of the coating formed may be further improved by adding silica to the composition of Example G, that is Example H.

A preferred example of the aqueous composition according to the invention is Example I. Its formulation is very similar to Example H with a lower silica content, giving the coating a slightly shinier appearance. This formulation does not contain an antifoaming agent, a fact which does not degrade the film deposition properties. The coating obtained is transparent, which has the advantage of not concealing the markings placed on the wall of the tires during their manufacture and their tests. This coating is particularly suitable for protecting white walls, which it enhances by virtue of its slightly shiny appearance. It does not have to be removed when vehicles equipped with tires thus coated are put into service.

Examples J, K and L correspond to three other preferred variants according to the invention. The aqueous composition is, in this case, based on a blend of three polymers:
StBuAc+EA/MM+PVP: Example J;
StBuAc+EA/MM+PVA: Example K;
StBuAc+PVAC+PVP: Example L.

The coatings obtained are excellent in all the tests. It should be noted that resistance to washing with rubbing in the presence of soap, is slightly inferior, but it may be useful to be able to remove the coating easily in certain cases.

In all cases, the presence of silica improves the appearance of the coating obtained, giving it a slightly matt appearance (Examples H, I, J, K and L). Finally, the presence of carbon black in Examples J, K and L improves the resistance to whitening in the presence of water and to large deformations.

A final test, specifically for ozone resistance, was carried out on Example J, the test being called the "Volkswagen test". The purpose of this test is to evaluate the ozone resistance of a tire wall. It consists of a static test carried out on a section of tire two centimeters in width taken from between the bead wire and the top plies. The section thus produced is fixed to a tube 20 millimeters in radius by a brass wire. The surface deformation is of the order of 12%. The test pieces thus prepared are exposed to ozone in an oven under the following conditions:

| | |
|---|---|
| Ozone concentration | 200 ± 15 pphm (parts per hundred million) |
| Relative humidity | 60 ± 5% |
| Temperature | 25 ± 2° C. |
| Duration | 46 hours |

The test has been successfully passed when visual observation reveals no crack initiation.

A tire was aged for four months and then half of it protected by a coating according to the invention. Control test pieces—without a protective coating—and protected test pieces were then removed and tested.

The control test pieces show pronounced cracking. The protected test pieces exhibit no initiation of cracking in the regions protected by the coating according to the invention.

This test, the most severe of all the tests demanded by automobile manufacturers, shows unambiguously the effectiveness of the protective coating according to the invention.

We claim:

1. A tire having an antimigration and antizone protective coating comprising a tire having an external surface and a coating on the external surface wherein the coating comprises:
   a) a constituent I having a glass transition temperature below 0° C., said constituent I being a homopolymer or copolymer based on at least one monomer selected from the group consisting of acrylic, methacrylic, and vinyl esters; and
   b) a constituent II selected from the group consisting of a hydrophilic silica and a homopolymer or copolymer based on at least one monomer selected from the group consisting of acrylic, methacrylic, and vinyl monomers, said homopolymer or copolymer having a glass transition temperature above 25° C.;

wherein the coating contains at most 40 parts of inorganic filler per 100 parts of dry polymer and the thickness of the coating is between 1 $\mu$m and 30 $\mu$m.

* * * * *

UNITED STATES PATENT AND TRADEMARK OFFICE
CERTIFICATE OF CORRECTION

PATENT NO. : 5,977,239
DATED : November 2, 1999
INVENTOR(S) : Chauffour et al.

It is certified that error appears in the above-identified patent and that said Letters Patent is hereby corrected as shown below:

Title page,
Item [73], Assignee, "CIE," should read -- Cie, --;

Column 8,
Line 30, "PVAC" should read -- PVAc --;

Column 10,
Line 6, "25º C.;" should read -- 25º C., --;

Signed and Sealed this

Twenty-ninth Day of June, 2004

JON W. DUDAS
*Acting Director of the United States Patent and Trademark Office*